US008493910B2

(12) United States Patent
Sarikaya et al.

(10) Patent No.: US 8,493,910 B2
(45) Date of Patent: Jul. 23, 2013

(54) PREFIX DELEGATION SUPPORT FOR MOBILE NETWORKS

(75) Inventors: Behcet Sarikaya, Wylie, TX (US); Yangsong Xia, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 732 days.

(21) Appl. No.: 12/389,565

(22) Filed: Feb. 20, 2009

(65) Prior Publication Data

US 2009/0225761 A1 Sep. 10, 2009

Related U.S. Application Data

(60) Provisional application No. 61/034,100, filed on Mar. 5, 2008.

(51) Int. Cl.
*H04W 4/00* (2009.01)
*H04L 12/28* (2006.01)

(52) U.S. Cl.
USPC ............ 370/328; 370/338; 370/389; 370/400

(58) Field of Classification Search
USPC ..................... 370/228, 338, 389, 401, 395.21
See application file for complete search history.

(56) References Cited

U.S. PATENT DOCUMENTS

| 2004/0047348 | A1* | 3/2004 | O'Neill | 370/389 |
|---|---|---|---|---|
| 2005/0117590 | A1* | 6/2005 | Ronneke | 370/395.52 |
| 2005/0128975 | A1* | 6/2005 | Kobayashi et al. | 370/328 |
| 2005/0265360 | A1* | 12/2005 | Kim et al. | 370/400 |
| 2006/0171370 | A1* | 8/2006 | Matsumoto et al. | 370/351 |
| 2006/0221921 | A1* | 10/2006 | Kniveton | 370/338 |
| 2007/0113075 | A1* | 5/2007 | Jo et al. | 713/158 |
| 2007/0115924 | A1* | 5/2007 | Schneider et al. | 370/352 |
| 2008/0002684 | A1* | 1/2008 | Kumazawa et al. | 370/389 |
| 2008/0089339 | A1* | 4/2008 | Tsirtsis et al. | 370/392 |

OTHER PUBLICATIONS

Korhonen et al. "RFC 5149—Service Selection for Mobile IPv6", Feb. 2008, 7 pages.*
Kniveton et al. "Mobile Network Prefix Delegation draft-ietf-nemo-prefix-delegation-00", Aug. 18, 2005, 28 pages.*
Hee-Jin et al. "DHCP Options for Home Information Discovery in MIPv6 draft-ietf-mip6-11.txt", Feb. 21, 2008, 24 Pages.*
Troan et al. "IPv6 Prefix Options for DHCPv6 draft-ietf-dhc-dhcpv6-opt-prefix-delegation-05.txt", Oct. 7, 2003, 21 Pages.*
Bradner, S., "Key Words for Use in RFCs to Indicate Requirement Levels," Network Working Group, RFC 2119, Mar. 1997, 3 pages.
Devarapalli, V., et al., "Network Mobility (NEMO) Basic Support Protocol," Network Working Group, RFC 3963, Jan. 2005, 31 pages.

(Continued)

*Primary Examiner* — Brandon Renner
(74) *Attorney, Agent, or Firm* — Conley Rose, P.C.; Grant Rodolph; Brandt Howell (57) ABSTRACT

An apparatus comprising a mobile router (MR) configured to communicate with a plurality of mobile nodes (MNs), wherein the MR is configured to obtain from a home agent (HA) a prefix for MNs using a binding update (BU) message and a binding acknowledgement (BA) message. Also disclosed is a network component comprising at least one processor configured to implement a method comprising requesting a mobile network prefix (MNP) using a BU message, receiving a BA message, and advertising the MNP to a MN if the MNP is received in the BA message. Also disclosed is a method comprising delegating at least one prefix for a MN by exchanging a BU message and a BA message between a MR and a HA.

16 Claims, 8 Drawing Sheets

OTHER PUBLICATIONS

Droms, R., et al., "Dynamic Host Configuration Protocol for IPv6 (DHCPv6)," Network Working Group, RFC 3315, Jul. 2003, 95 pages.

Ernst, T., "Network Mobility Support Goals and Requirements," Network Working Group, RFC 4886, Jul. 2007, 13 pages.

Gundavelli, S., et al., "Proxy Mobile IPv6," Network Working Group, RFC 5213, Aug. 2008, 8 pages.

Johnson, D., et al., "Mobility Support in IPv6," Network Working Group, RFC 3775, Jun. 2004, 155 pages.

Kaufman, C., "Internet Key Exchange (IKEv2) Protocol," Network Working Group, RFC 4306, Dec. 2005, 93 pages.

Narten, T., et al., "Neighbor Discovery for IP Version 6 (IPv6)," Network Working Group, RFC 4861, Sep. 2007, 91 pages.

Rose, M., "Writing I-Ds and RFCs Using XML," Network Working Group, RFC 2629, Jun. 1999, 29 pages.

Troan, O., et al., "IPv6 Prefix Options for Dynamic Host Configuration Protocol (DHCP) Version 6," Network Working Group, RFC 3633, Dec. 2003, 18 pages.

Devarapalli, V., et al., "Mobile IPv6 Home Link Operation over SDO Point-to-Point Links," Network Working Group, Internet Draft, draft-devarapalli-mext-mipv6-home-link-01.txt, Feb. 24, 2008, 14 pages.

Droms, R., et al., "DHCPv6 Prefix Delegation for NEMO," IPv6 Group, Internet Draft, draft-ietf-nemo-dhcpv6-pd-03, Dec. 6, 2007, 12 pages.

Korhonen, J., et al., "Diameter Mobile IPv6: Support for Home Agent to Diameter Server Interaction," Diameter Maintenance and Extensions (DIME), Internet Draft, draft-ietf-dime-mip6-split-16.txt, Dec. 29, 2008, 44 pages.

Thubert, P., et al., "Mobile Network Prefix Delegation," Network Mobility, Internet Draft, draft-ietf-prefix-delegation-02.txt, Aug. 21, 2007, 23 pages.

* cited by examiner

PREFIX DELEGATION SUPPORT FOR MOBILE NETWORKS

CROSS-REFERENCE TO RELATED APPLICATIONS

This application claims priority to U.S. Provisional Application No. 61/034,100 filed Mar. 5, 2008 by Behcet Sarikaya et al. and entitled "Prefix Delegation Support for Mobile Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In mobile networks, mobile nodes (MNs) are assigned network addresses, which allow data to be transported and delivered to the customers. For example, the network addresses can be assigned according to the Internet Protocol version 6 (IPv6) network layer protocol. The IPv6 network address may be about 128 bits in length, which comprises a prefix that is about 64 bits in length and an interface identifier also that is about 64 bits in length. Typically, the prefix is assigned by the network, while the interface identifier is created by the MN. While moving or traveling, a MN may establish a link or connection with a new service provider network, and hence new prefixes are reassigned to the MN. Alternatively, the MN may be in communication with a moving service provider, such as on a train, ship, or aircraft. In such a case, new prefixes may be assigned to the MN as well.

In some cases, a network mobility (NEMO) protocol may be used to support network mobility, e.g. allow session continuity for the MNs as the mobile network moves. In such cases, a plurality of IPv6 prefixes, referred to as mobile network prefixes (MNPs), are delegated to a Mobile Router (MR) in the network, which in turn advertises the MNPs to the MNs. However, no means exist for dynamically provisioning the MNPs to the MR.

SUMMARY

In a first embodiment, the disclosure includes an apparatus comprising a MR configured to communicate with a plurality of MNs, wherein the MR is configured to obtain from a home agent (HA) a prefix for MNs using a binding update (BU) message and a binding acknowledgement (BA) message.

In a second embodiment, the disclosure includes a network component comprising at least one processor configured to implement a method comprising requesting a MNP using a BU message, receiving a BA message, and advertising the MNP to a MN if the MNP is received in the BA message.

In a third embodiment, the disclosure includes a method comprising delegating at least one prefix for a MN by exchanging a BU message and a BA message between a MR and a HA.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a Proxy Mobile IPv6 system, MN prefixes may be requested via a mobile access gateway (MAG) using proxy BU messages and delegated via a local mobility agent (LMA) using proxy BA messages. Disclosed herein is an improved system and method for prefix delegation in a mobile network comprising a MR using the NEMO protocol (RFC 3963 by Devarapalli et al. and entitled "Network Mobility (NEMO) Basic Support Protocol," which is incorporated herein by reference as if reproduced in its entirety). Specifically, the MR may request a plurality of prefixes from a HA using a BU message. The HA may be a delegating agent or requesting router that obtains the prefixes from a delegating server or router, such as a Dynamic Host Configuration Protocol (DHCP) server or an Authentication, Authorization and Accounting (AAA) server. Hence, the HA may forward the delegated prefixes using a BA message to the MR, which may then advertise the prefixes to the MNs. Using such improved prefix delegation may reduce the design requirements for the MR in the mobile network and increase flexibility in exchanging the delegated prefixes.

Figure 1:
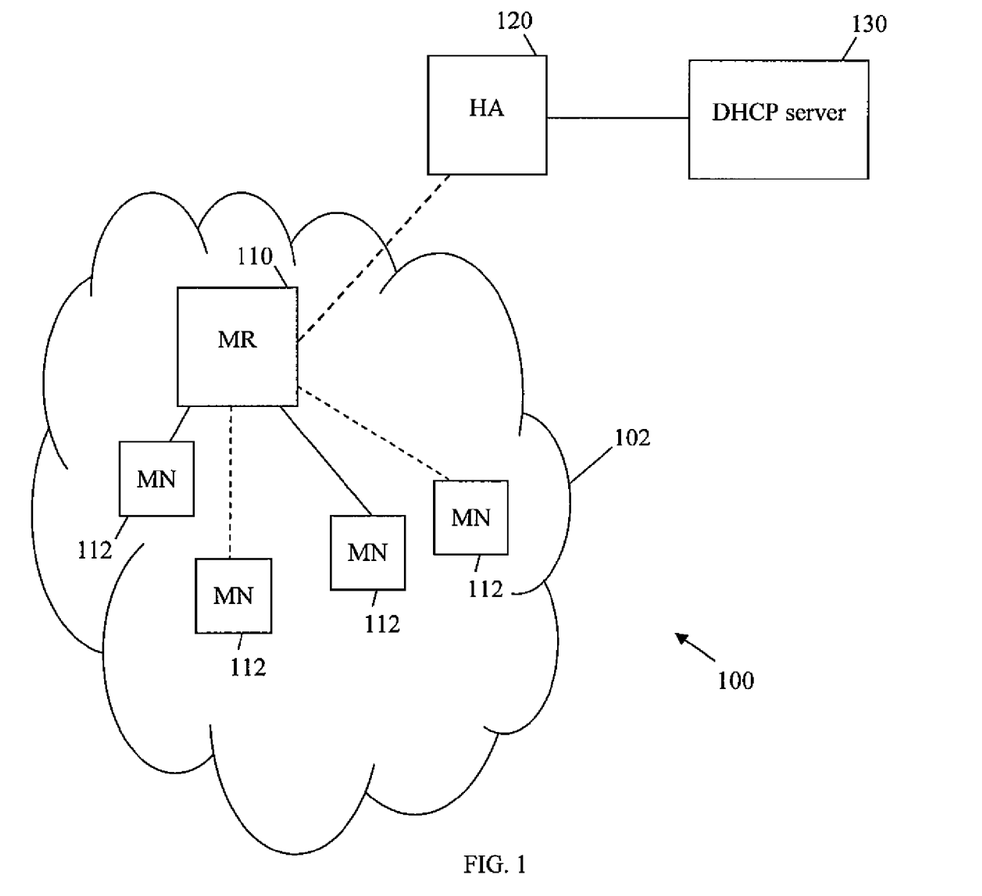
FIG. 1 is a schematic diagram of one embodiment of a mobile network system.

FIG. 1 illustrates an embodiment of a mobile network system 100, which may support the NEMO protocol and provide improved prefix delegation. The mobile network system 100 may comprise a MR 110 and a plurality of MNs 112, which may be located at a mobile network 102. Additionally, the mobile network system 100 may comprise a HA 120 and a delegating server 130. The mobile network 102 may establish connections and communicate with one or a plurality of other networks (not shown in FIG. 1), such as server provider networks, while moving or traveling. For example, the MR 110 and the MN 112 may be located in a moving train, ship, aircraft, or other traveling vehicles or mediums. The mobile network 102 may establish new connections or links with different networks or with the same network at different locations. The mobile network 102 may connect to a different provider at each location, but the MR 110 should register its new address with the HA 120 so that connections to the mobile network 102 can be maintained anchored at the HA 120.

In an embodiment, the MR 110 may be any device, component, or network that allows the MNs 112 to communicate with another network. In an embodiment, the MR 110 may be the first Internet Protocol (IP) router that the MNs 112 encounter. For example, the MR 110 may be a wireless router that provides wireless access network coverage to the MNs 112. Additionally, the MR 110 may forward a plurality of IPv6 packets between the MNs 112 and the other network, for instance via the HA 120. The MR 110 may communicate with the MNs 112 via a plurality of fixed links, such as electrical or optical links, via a plurality of wireless links, or both. Additionally, the MR 110 may communicate with the HA 120, with another network, or both via a wireless link. In FIG. 1, the fixed links are represented by solid lines and the wireless links are represented by dashed lines.

In an embodiment, the MNs 112 may be any mobile devices, components, or networks that use the MR 110 to access another network. Specifically, the MNs 112 may be mobile user-oriented devices that communicate with the MR 110. For example, the MNs 112 may be cellular phones, notebook computers, personal digital assistants (PDAs), or any other wireless devices. Additionally or alternatively, the MNs 112 may be fixed communications devices, such as desktop computers or set top boxes, which may be connected to the MR 110 and traveling within the mobile network 102.

In an embodiment, the HA 120 may be any device, component, or network that provides connectivity or external access to the mobile network 102. For example, the HA 120 may be a LMA of Proxy Mobile IPv6, or a Packet Data Servicing Node (PDSN) or a Gateway GPRS Support Node (GGSN) in a 3GPP network. Specifically, the HA 120 may be a fixed node that acts as a DHCP client or an AAA client for delegating prefixes to the MNs 112. As such, the HA 120 may receive the prefix requests from the MR 110 and forward the delegated prefixes from the delegating server 130 to the MR 110. The HA 120 may also handle IP routing between the MNs 112 via the MR 110 and another network, based on a plurality of assigned IP addresses.

In an embodiment, the delegating server 130 may be a server or network that provides all or part of an address. In an embodiment, the delegating server 130 may be a DHCP server, which may be configured to allocate the IP addresses or prefixes. For instance, the delegating server 130 may allocate IPv6 prefixes, using a DHCPv6 protocol. The DHCP server may ensure that all the assigned IP addresses are unique, e.g. no IP address is simultaneously assigned to a plurality of MNs 102 or clients. For instance, the DHCP server may provide IP address leases that typically comprise the IP address or prefix and an IP address lease time, which may be renewed upon request by the MR 110 via the HA 120. Alternatively, the delegating server 130 may be an Authentication, Authorization and Accounting (AAA) server, which may be configured to allocate the IP addresses or prefixes using the AAA protocol. In some embodiments, the delegating server 130 may authenticate the mobile network 102, the MR 110, the MNs 112, or combinations thereof before assigning the IP addresses or prefixes.

In an embodiment, the MR 110 may initially establish a home link with the HA 120 to access another network, such as a service provider network. For instance, the MR 110 and the HA 120 may establish a bi-directional tunnel to exchange communications over a wireless link. When the MR 110 is authenticated with HA 120, for instance using the delegating server 130, the MR 110 may be assigned a unique home address. The home address may be advertised on the home link between the MR 110 and the HA 120 or delegated to the MR 110. The home address may also match a link-local address assigned to the home link. In some embodiment, at least one home link prefix, which may be issued by the delegating server 130, may be received by the MR 110 via the HA 120.

The MR 110 may boot up in the new network over a visited link. The MR 110 then has to get the MNPs from the HA 120, and it is natural in this case to use BU to request MNPs and get MNPs in BA. Specifically, the MR 110 may send a BU message comprising the prefix request to the HA 120, which may be a delegating agent. The HA 120 may obtain a plurality of prefixes from the delegating server 130 using an appropriate protocol, such as a DHCPv6, Radius, or Diameter. The HA 120 may then forward a BA message comprising the delegated prefixes to the MR 110. In turn, the MR 110 may advertise the prefixes to the MNs 112 in the mobile network 102.

In an embodiment, the HA 120 may dynamically broadcast the MNPs to a plurality of MRs 110 in a plurality of mobile networks 102. Thus, the MNPs may be routed using a routing protocol, such as Interior Gateway Protocol (IGP) or Open Shortest Path First (OSPF), to all the MRs 110 connected to the HA 120, which may cause high routing traffic when the quantity of MNPs increases substantially. As such, the HA 120 may use route aggregation to reduce routing traffic. For example, the HA 120 may be assigned /32 or /48 prefixes and each MR 110 interface may be assigned /48 or /64 prefixes. For example, the prefixes assigned to the HA 120 may comprise 3FFE:FFFF:0::/48 and the prefixes assigned to the MR 110 interface may comprise 3FFE:FFFF:0:2::/64. In this case, the HA 120 may only broadcast 3FFE:FFFF:0::/48 upstream.

In an embodiment, the HA 120 may be the requesting router instead of the MR 110, which may reduce the design requirements for the MR 110. For instance, if the MR 110 exchanges the BA and BU messages with the HA 120, the MR 110 may not need to implement a prefix delegating protocol, such as the DHCP protocol on its upstream interface. Additionally, the MR 110 may not require a local relay agent to obtain the prefixes from the HA 120, such as a DHCPv6 relay agent to obtain IPv6 prefixes. Since a DHCP relay may be only one hop away from a DHCP server, using a local relay agent at the MR 110 may also require using a DHCP server at the HA 120, which may add more design restrictions or requirements. Instead, in the mobile network system 100 the HA 120 may comprise a prefix delegating client, such as a DHCP client if the delegating server 130 may be in the same network as the HA 120. Alternatively, the HA 120 may be coupled to a relay agent if the delegating server 130 may be located on a different network. The relay agent may be located at the same link as the HA and configured with the address of the DHCP server. Further, using the BU and BA messages to delegate the prefixes instead of DHCPv6 messages may reduce the complexity of the message exchange between the MR 110 and the HA 120 because the MR 110 is a moving entity.

Figure 2:
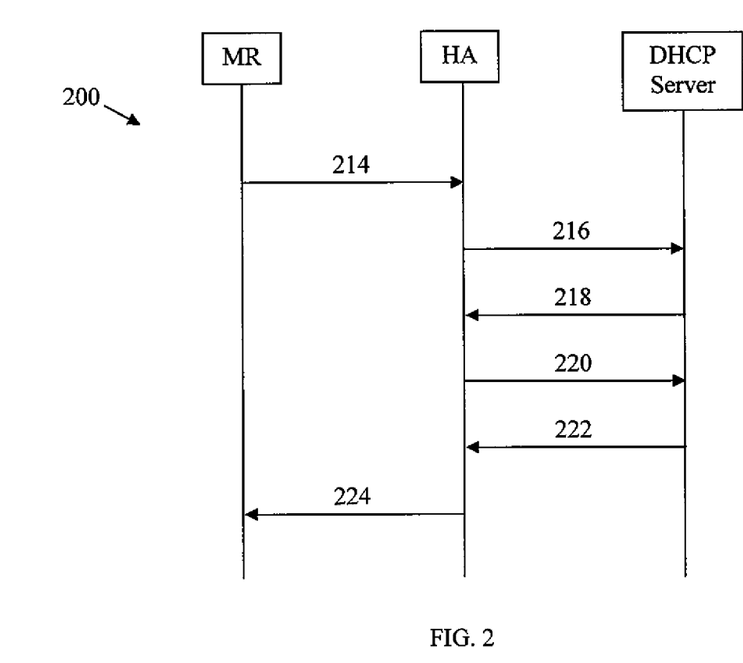
FIG. 2 is a protocol diagram of one embodiment of a prefix delegation method.

FIG. 2 illustrates an embodiment of a prefix delegation method 200, which may be used to delegate new MNPs in the mobile network, for instance upon relocating and establishing a new visited link between the MR and the HA, for instance for the MR that boots at the visited link. The prefix delegation method 200 may request the prefixes from a HA using a BU message, obtain the prefixes from a delegating server, such as a DHCP server, and forward the prefixes to a MR in the mobile network using a BA message.

Specifically, the MR may send a BU message 214, over the visited link to request a prefix for at least one MN. The BU message 214 may comprise a Home Network Prefix option for each MN. The Home Network Prefix option may comprise prefix information, such as the assigned home link prefixes corresponding to the mobile network, e.g. the mobile network 102, and is discussed in further detail below. Additionally, the BU message 214 may comprise a Mobile Router (R) flag, which may be set to indicate that the BU message 214 is a prefix request message from the MR. The HA may receive the BU message 214 and detect the R flag. Hence, the HA may request from the DHCP server a prefix for each received Home Network Prefix option, for instance as described in the RFC 3315 published by the IETF and entitled "Dynamic Host Configuration Protocol for IPv6 (DHCPv6)," which is incorporated herein by reference as if reproduced in its entirety. The HA may send a Solicit message 216, which may comprise at least one Identity Association for Prefix Delegation (IA-PD) for each Home Network Prefix option in the BU message 214. The HA may create the IA-PD and assign it a unique IA Identifier (IAID). In reply, the DHCP server may return an Advertise message 218.

Next, the HA may send a Request message 220 to the DHCP server to obtain or update the prefixes. The Request message 220 may comprise an IA-PD Prefix option for each IA-PD to exchange prefix information. The DHCP server may send a Reply message 222 comprising the delegated prefixes and the corresponding lifetimes. For example, the Reply message 222 may comprise a prefix table comprising the prefix and lifetime information. Finally, the HA may send to the MR a BA message 224 comprising at least one Home Network Prefix option that comprises one delegated prefix.

Figure 3:
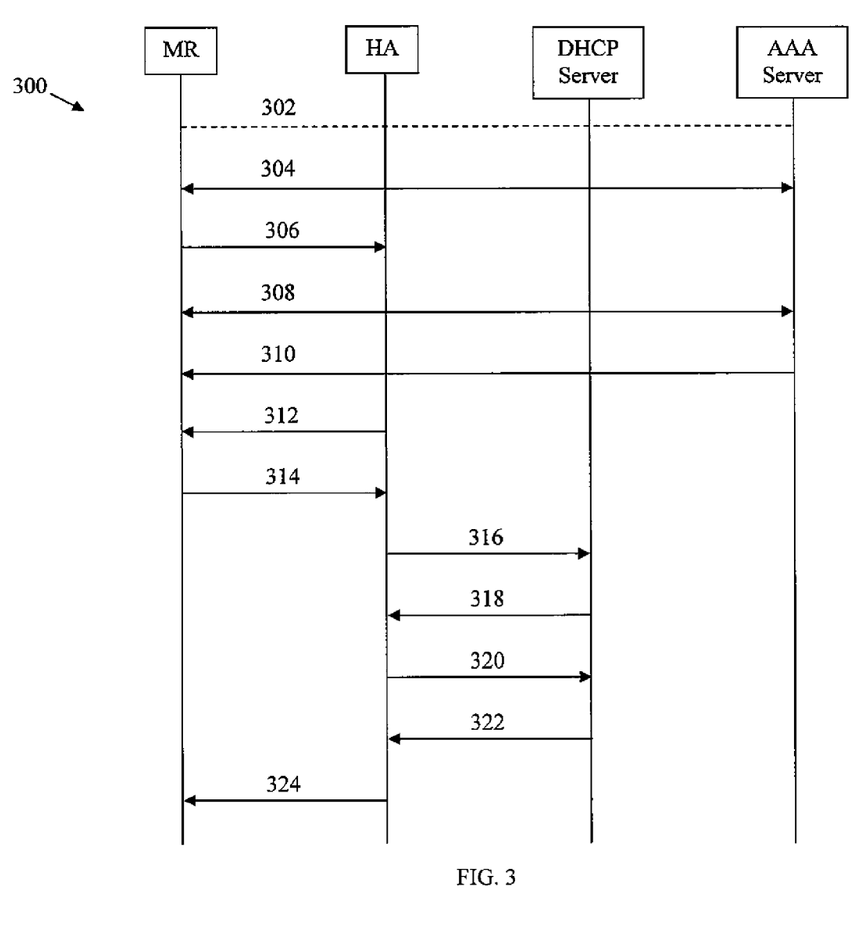
FIG. 3 is a protocol diagram of another embodiment of a prefix delegation method.

FIG. 3 illustrates another embodiment of a prefix delegation method 300 for delegating the prefixes in the mobile network, for instance to establish a home link between the MR and the HA and obtain the MNPs. Specifically, the MR may initiate a connection 302 with the HA, which may in turn connect to an authentication and authorization server, such as an AAA server. The MR may start a security association 304 with the HA and the AAA server, for instance using an Internet Key Exchange (IKE) or IKE version 2 (IKEv2) protocol. The MR may then send a CFG_REQUEST payload message 306 to request at least one prefix to configure the home link. The CFG_REQUEST payload message 306 may comprise an INTERNAL_IP6_SUBNET attribute, which may be set to zero, to indicate a prefix request. In an embodiment, a plurality of INTERNAL_IP6_SUBNET attributes may be used for each prefix request. Next, the MR may be authenticated with the HA using an Extensible Authentication Protocol (EAP) exchange 308 with the AAA server. Upon successful authentication, the MR may receive a success message 310, which may indicate that the HA is ready to assign the prefixes, for instance a DHCP server.

The HA may then send to the MR a CFG_REPLY payload 312 comprising at least one prefix assigned to the home link. In an embodiment, the CFG_REPLY payload 312 may comprise a plurality of INTERNAL_IP6_SUBNET attributes comprising a home link prefix and a prefix length. The MR may then send a BU message 314, which may comprise a Home Network Prefix option for each MN. The BU message 314 may comprise a Home Link Exchange (C) flag, which may be set to indicate a MNP request for one of the MN nodes in the mobile network.

When implicit operation mode defined in RFC 3963 is used, the MR and the HA may run a dynamic routing protocol such as OSPF to manage the prefixes. In implicit mode, the BU message 314 may not comprise any Mobile Network Prefix or Home Network Prefix options because the routing protocol, e.g. OSPF manages the prefixes. The HA, as the requesting router, uses DHCPv6 prefix delegation (RFC 3633) to request prefixes for the mobile network from DHCP server as the delegating router. However, all features defined in the present disclosure are applicable to the explicit mode defined in RFC 3963.

The HA may receive the BU message 314 and verify whether the C flag is set. If the C flag is set and the MR is connected to the HA over a home link, the HA may request from the DHCP server a prefix for each received Home Network Prefix option. Similar to the prefix delegation method 200, the HA may send a Solicit message 316 to the DHCP server and receive in reply an Advertise message 318. To obtain the delegated MNPs, the HA may exchange a Request message 320 and Reply message 322 with the DHCP server, as described above. The HA may forward the delegated MNPs to the MR using a BA message 324.

In alternative embodiments to the prefix delegation method 200 and the prefix delegation method 300, the four-way exchange between the requesting router, e.g. HA, and the delegating server, e.g. DHCP server, may be reduced. Instead of exchanging messages 216, 218, 220, and 222 in FIG. 2, or messages 316, 318, 320, and 322 in FIG. 3, two messages may be exchanged between the HA and the DHCP server, for instance using the Rapid Commit option as described in RFC 3315. As such, the HA may send a Solicit message comprising the Rapid Commit option to the DHCP server, which may in return send a Reply message to the HA comprising the prefix information.

In an embodiment, after receiving the prefixes from the HA, the MR may advertise the prefixes to the MNs using at least one Router Advertisement (RA) message. As such, the MR may assign the same lifetimes associated with the received prefixes, which may be set by the HA, the DHCP server, or a third entity. Alternatively, the MR may set the prefix lifetimes, for instance based on a policy profile. Further, to extend the lifetime for each prefix, the HA may send a Renew message to the DHCP server. The DHCP server may then determine a new lifetime for each prefix and return the prefix with the renewed lifetime to the HA in a Reply message. In some embodiments, the DHCP may replace at least one prefix or add least one new prefix and prefix lifetime in the Reply message.

In other embodiments, the MR may initiate the prefix lifetime renewal request. As such, the MR may send to the HA a BU message comprising at least one assigned MNP. The BU message may comprise a Home Network Prefix option corresponding to the assigned MNP and comprising an R flag that may be cleared or not set. Hence, the HA may exchange a Renew message and Reply message with the DHCP server to renew the MNP. The HA may then send a BA message to the MR comprising the assigned MNP and a Q bit, which may be set to indicate the renewed MNP.

Figure 4:
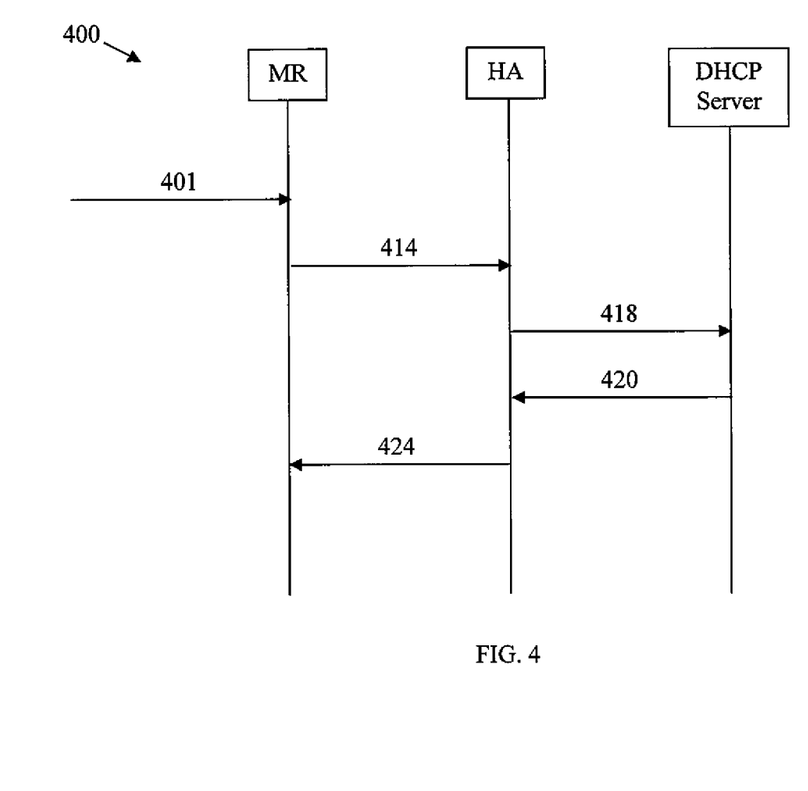
FIG. 4 is a protocol diagram of one embodiment of a prefix release method.

FIG. 4 illustrates an embodiment of a prefix release method 400, which may be used to release at least one assigned MNP. The prefix release method 400 may be initiated by the MR, for instance when the MR detects the deregistration 401 of a MN in the mobile network. For instance, when a local MN (LMN) or visiting MN (VMN) that does not share its MNP with another MN leaves the mobile network, the MR may initiate the deregistration event. Hence, the MR may send to the HA a BU message 414 comprising a Home Network Prefix option associated with the MNP and comprising an R flag that may be set. When the HA receives the BU message 414 and detects the R flag, the HA may send a Release message 418 to the DHCP server. The Release message 418 may comprise an IA-PD indicating the MNP to be released. The DHCP server may then send a Reply message 420 to the HA, which may in turn send a BA message 424 to the MR to confirm the release. Accordingly, the MR may stop advertising the released MNP in the mobile network.

Figure 5:
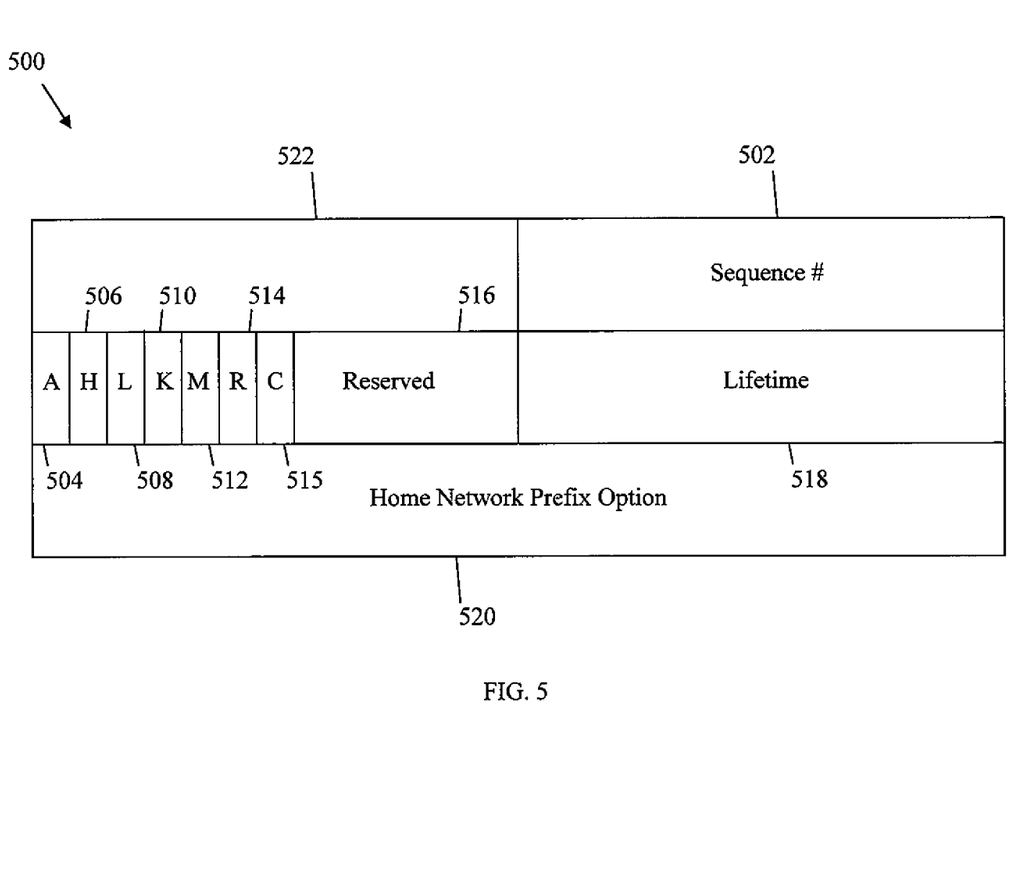
FIG. 5 is an illustration of one embodiment of a binding update message.

FIG. 5 is an embodiment of a BU message 500, which may be used to send the prefix request from a MR to a HA. The BU message 500 may comprise a Sequence number 502, an Acknowledge (A) flag 504, a Home address (H) flag 506, a Link-local address compatibility (L) flag 508, a Key management mobility capability (K) flag 510, an Managed address configuration (M) flag 512, an R flag 514, a C flag 515, a Reserved field 516, a Lifetime field 518, and at least one Home Network Prefix option 520. In an embodiment, each of the A flag 504, the H flag 506, the L flag 508, the K flag 510, the M flag 512, the R flag 514, and the C flag 515 may have a length of about one bit, each of the Sequence number 502 and the Lifetime field 518 may have a length of about 16 bits, and the Reserved field 516 may have a length of about 10 bits. Additionally, the BU message 500 may comprise an unused or padded field 522, which may have a length at about 16 bits.

In some embodiments, at least some of the fields of the BU message 500 may be configured based on RFC 3963. For instance, the Sequence number 502 may be used to match the BU message 500 with a corresponding BA message, and the A flag 504 may be set to request a BA message reply. In addition, the H flag 506 may be set to indicate that the BU message 500 is sent to a HA, and the L flag 508 may be set to indicate that the home address of the MR matches its link-local address. Furthermore, the K flag 510 may be cleared or not set to indicate that the protocol used to establish IP Security (IPsec) security associations between the MR and the HA does not survive movements, and the M flag 512 may be set to indicate a stateful address reconfiguration option. The R flag 514 may be set to indicate that the BU message 500 is sent from a MR. The C flag 515 may be set to indicate an established home link between the MR and the HA. Alternatively, the C flag 515 may be cleared to indicate that the MR is connected to the HA via a visited link. In some embodiments, when the BU message 500 is sent over a visited link, the BU message 500 may not comprise the C flag 515. The Reserved field 516 may be reserved for other purposes and/or may not be used. For instance, the Reserved field 516 may be initialized to zero and ignored. The Lifetime field 518 may indicate the quantity of time units remaining before the prefix request expires. The Mobile Network Prefix option 520 may comprise prefix information, such as the assigned mobile network prefixes. The BU message 500 may comprise a plurality of Mobile Network Prefix options 520 to request a plurality of MNPs for a plurality of corresponding MNs. In this disclosure, we use Home Network Prefix (RFC 5213) instead of Mobile Network Prefix to provide compatibility with the proxy BU and proxy BA messages of Proxy Mobile IPv6.

Figure 6:
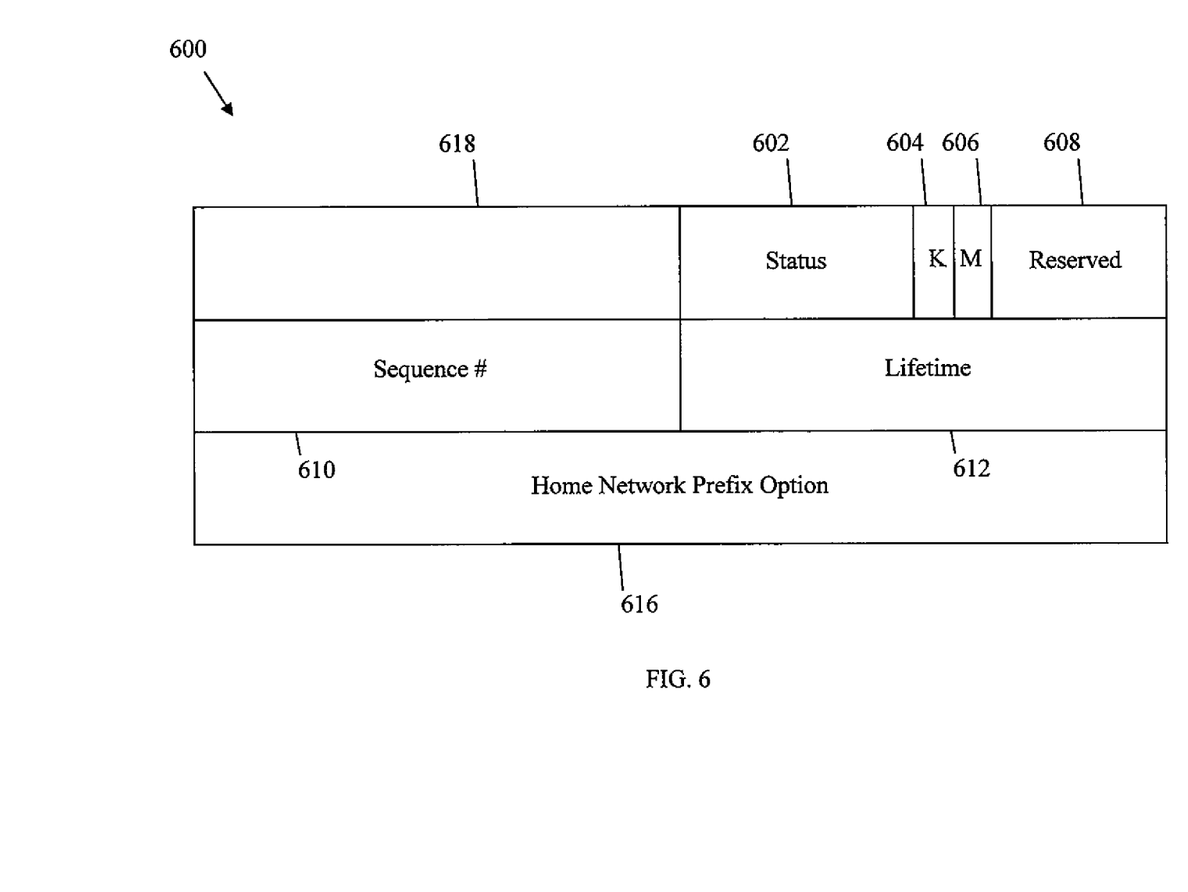
FIG. 6 is an illustration of one embodiment of a binding acknowledgement message.

FIG. 6 is an embodiment of a BA message 600, which may be used to send the assigned MNPs from the HA to the MR in response to a corresponding BU message, such as the BU message 500. The BA message 600 may comprise a Status field 602, a K flag 604, an M flag 606, a Reserved field 608, a Sequence number 610, a Lifetime field 612, and at least one Home Network Prefix option 616. In an embodiment, each of the K flag 604 and M flag 606 may have a length of about one bit, the Status field 602 may have a length of about eight bits, the Reserved field 608 may have a length of about six bits, and each of the Sequence number 610 and Lifetime field 612 may have a length of about 16 bits. Additionally, the BA message 600 may comprise an unused or padded field 618, which may have a length at about 16 bits.

In some embodiments, at least some of the fields of the BA message 600 may be configured based on RFC 3963. For instance, the Status field 602 may indicate the disposition of the BU message corresponding to the BA message 600. For instance, the Status field 602 may be less than about 128 to indicate that the BA message 600 was received and accepted and greater than or equal to 128 to indicate that the BU message was rejected. For example, when the BU message is accepted, the Status field 602 may be set to about one if a prefix discovery was required or to about zero otherwise if no further action is required. When the BU message is rejected, the Status field 602 may be set to about 128 if no reason is specified, to about 129 if the message was administratively prohibited, or to about 130 if there are no sufficient resources to process the prefix request. The Status field 602 may be set to about 131 if home registration is not supported, to about 132 if no home subnet is designated, to about 133 if no home agent is assigned, or to about 134 if Duplicate Address Detection (DAD) fails. The Status field 602 may also be set to about 135 if the Sequence number in the corresponding BU message is out of window, e.g. exceeds a limit, to about 136 if a home nonce index is expired, to about 137 if a care-of nonce index is expired, to about 138 if at least some nonces expire, or to about 139 if the registration type change is not allowed. In an embodiment, the values that may be assigned to the Status field 602 may be specified in the Internet Assigned Numbers Authority (IANA).

The K flag 604 and M flag 606 may be substantially similar to the K flag and M flag of the corresponding BU message, such as the K flag 510 and M flag 512. The Reserved field 608 may be reserved for other purposes and/or may not be used. The Sequence number 610 may be copied from the Sequence Number of the corresponding BU message, such as the Sequence number 502, to match the two BU and BA messages. The Lifetime field 612 may indicate the quantity of time units, such as about four seconds units, for retaining the prefix information of the BA message 600. In an embodiment, the Lifetime field 612 may be set to about zero if the Status field 602 indicates that the corresponding BU message was rejected. The Home Network Prefix option 616 may comprise the assigned MNP corresponding to one MN in the mobile network. The BA message 600 may comprise a plurality of Home Network Prefix options 616 corresponding to a plurality of MNs.

Figure 7:
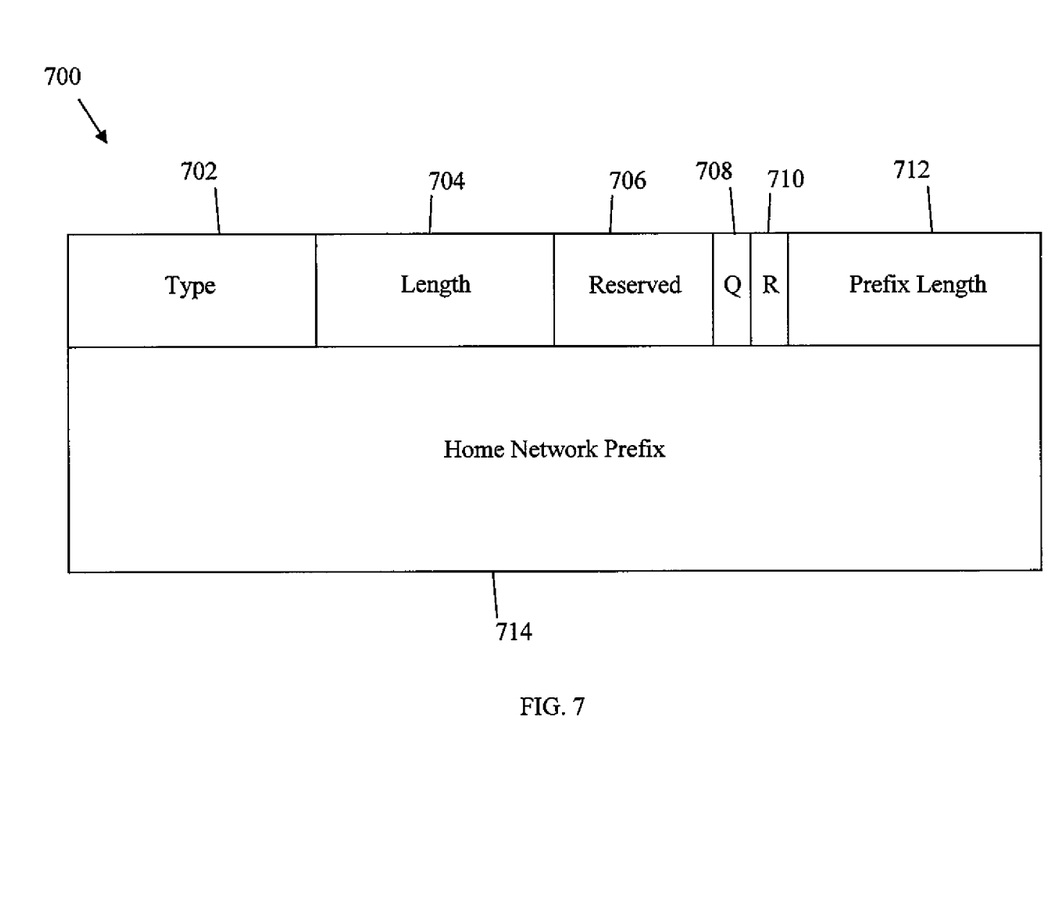
FIG. 7 is an illustration of one embodiment of a home network prefix option.

FIG. 7 illustrates an embodiment of a Home Network Prefix option 700, which may comprise prefix information exchanged between the MR and the HA. Specifically, the Home Network Prefix option 700 may be sent using a BU message, such as the Home Network Prefix option 520 of the BU message 500, or a BA message, such as the Home Network Prefix option 616 of the BA message 600. The Home Network Prefix option 700 may comprise a Type 702, a Length 704, a Reserved field 706, a Request (Q) flag 708, a Release (R) flag 710, a Prefix Length 712, and a Home Network Prefix 714. In an embodiment, each of the Q flag 708 and the R flag 710 may have a length of about one bit, each of the Type 702, the Length 704, and the Prefix Length 712 may have a length of about eight bits, the Reserved field 706 may have a length of about six bits, and the Home Network Prefix 714 may have a length of about 16 bytes.

In some embodiments, at least some of the fields of the Home Network Prefix option 700 may be configured based on the RFC 5213 published by the IETF and entitled "Proxy Mobile IPv6," which is incorporated herein by reference as if reproduced in its entirety. For instance, the Type 702 may be set to about 22 to indicate a Home Network Prefix option. The Length 704 may indicate the length of the Home Network Prefix option 700 in octets, excluding the length of the Type 702 and the Length 704. For instance, the Length 704 may be set to about 18 bytes. The Reserved field 706 may be reserved for other purposes or may not be used. For instance, the Reserved field 706 may be initialized to zero and ignored. The Prefix Length 712 may indicate the length of the prefix in the Home Network Prefix option 700.

In an embodiment, the Q flag 708 may be set to indicate a prefix request. Additionally, the R flag 710 may be set to indicate a prefix release request. The Home Network Prefix 714 may comprise prefix information. Specifically, when the Home Network Prefix option 700 is sent using a BU message over a home link, the Home Network Prefix 714 may comprise at least one home link prefix, which may be assigned during establishing the home link between the MR and the HA. Alternatively, in the BU message, the Prefix Length 712 and the Home Network Prefix 714 may both be set to zero, for instance when a MR relocates and establishes a visited link with the HA. On the other hand, when the Home Network Prefix option 700 is sent using a BU message, the Home Network Prefix 714 may comprise the MNP delegated to one of the MNs in the mobile network.

Figure 8:
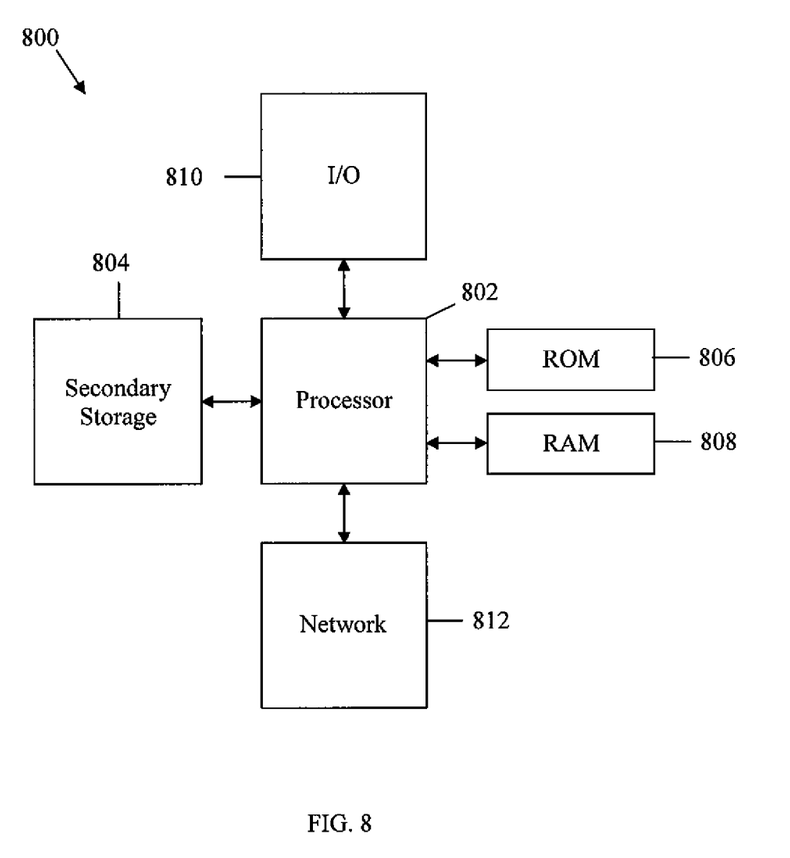
FIG. 8 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 8 illustrates a typical, general-purpose network component 800 suitable for implementing one or more embodiments of the components disclosed herein. The network component 800 includes a processor 802 (which may be referred to as a central processor unit or CPU) that is in communication with memory devices including secondary storage 804, read only memory (ROM) 806, random access memory (RAM) 808, input/output (I/O) devices 810, and network connectivity devices 812. The processor 802 may be implemented as one or more CPU chips, or may be part of one or more application specific integrated circuits (ASICs).

The secondary storage 804 is typically comprised of one or more disk drives or erasable programmable ROM (EPROM) and is used for non-volatile storage of data. Secondary storage 804 may be used to store programs that are loaded into RAM 808 when such programs are selected for execution. The ROM 806 is used to store instructions and perhaps data that are read during program execution. ROM 806 is a non-volatile memory device that typically has a small memory capacity relative to the larger memory capacity of secondary storage 804. The RAM 808 is used to store volatile data and perhaps to store instructions. Access to both ROM 806 and RAM 808 is typically faster than to secondary storage 804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
 a mobile router (MR) configured to communicate a plurality of Mobile Network Prefixes (MNPs) to a plurality of mobile nodes (MNs),
 wherein the MR is configured to:
  obtain from a home agent (HA) the MNPs for the MNs using a binding update (BU) message and a binding acknowledgement (BA) message, wherein the BU message comprises a Home Link Exchange (C) flag and a plurality of Home Network Prefix options, wherein the C flag is set to indicate that the MR is connected to the HA via a home link, and wherein each of the Home Network Prefix options comprises a Request (Q) flag that is set to indicate a prefix request;
  boot up over a visited link after obtaining the plurality of MNPs; and
  obtain from the HA a second plurality of MNPs for the MNs using a second BU message comprising a second plurality of Home Network Prefix Options,
 wherein the second BU message further comprises a second C flag that is cleared to indicate that the MR is connected to the HA via a visited link.

2. The apparatus of claim 1, wherein the MNPs are delegated using a Dynamic Host Configuration Protocol (DHCP) version 6 server or an Authentication, Authorization, and Accounting (AAA) server.

3. The apparatus of claim 1, wherein the BA message comprises a third plurality of Home Network Prefix options, each of which comprises one of the MNPs.

4. The apparatus of claim 1, wherein each of the Home Network Prefix options comprises a Type, a Length, a Reserved field, a Release (R) flag, a Prefix Length, and the Home Network Prefix.

5. The apparatus of claim 4, wherein the MR is further configured to release a MNP by using a third BU message comprising a home network prefix option with the R flag set.

6. The apparatus of claim 4, wherein the MR is further configured to renew a lifetime of a MNP by sending a third BU message comprising a home network prefix option with the R flag not set.

7. The apparatus of claim 1, wherein the MR is further configured to broadcast the plurality of MNPs to the MNs.

8. A network component comprising:
at least one processor configured to:
request a plurality of mobile network prefixes (MNPs) from a home agent (HA) using a binding update (BU) message that is sent over a home link, wherein the BU message comprises a plurality of Home Network Prefix options, and wherein each of the Home Network Prefix options comprises a Request (Q) flag that is set to indicate a prefix request;
receive the MNPs from the HA;
advertise each of the MNPs to a corresponding mobile node (MN);
boot up over a visited link after receiving the MNPs;
request a second plurality of MNPs using a second BU message, wherein the second BU message comprises a second plurality of Network Prefix options, each of which comprises a second Q flag that is set to indicate a second prefix request;
receive the second plurality of MNPs; and
advertise each of the second plurality of MNPs to the corresponding MN.

9. The network component of claim 8, wherein each MNP is delegated using a four-way exchange with a delegating server, and wherein each four-way exchange comprises a solicit message, an advertise message, a request message, and a reply message.

10. The network component of claim 9, wherein each solicit message comprises an Identity Association for Prefix Delegation (IA-PD) that corresponds to the MNP and that is assigned an IA Identifier (IAID).

11. The network component of claim 8, wherein each MNP is delegated by exchanging a solicit message comprising a Rapid Commit option and a reply message between the requesting router and a delegating server.

12. The network component of claim 8, wherein the processor is further configured to:
establish a link with a requesting router;
request an MNP for the link;
provide authentication to the requesting router; and
receive the MNP for the link.

13. The network component of claim 12, wherein the link is established using a security association based on an Internet Key Exchange (IKE) or IKE version 2 (IKEv2) protocol, wherein the MNP for the link is requested using a CFG_REQUEST payload message, wherein an Extensible Authentication Protocol (EAP) is used for providing authentication to the requesting router, and wherein the MNP for the link is received using a GFG_REPLY payload message.

14. The network component of claim 13, wherein the CFG_REQUEST payload message, the CFG_REPLY payload message, or both comprise at least one INTERNAL_IP6_SUBNET attribute that indicates a MNP request.

15. A method comprising:
delegating a plurality of mobile network prefixes (MNPs) by exchanging a binding update (BU) message and a binding acknowledgment (BA) message between a mobile router (MR) and a home agent (HA) over a home link, wherein the BU message comprises a plurality of Home Network Prefix options, each of which comprises a Request (Q) flag that is set to indicate a prefix request;
releasing some of the MNPs by exchanging a second BU message between the MR and the HA; and
delegating a second plurality of MNPs by exchanging a third BU message between the MR and HA over a visited link,
wherein the third BU message comprises a second plurality of Home Network Prefix Options, each of which comprises a second Q flag that is set to indicate a second prefix request, and
wherein the second BU message comprises a second plurality of Home Network Prefix options, each of which comprises a Release (R) flag that is set to indicate a prefix release.

16. The method of claim 15,
wherein each MNP has a prefix lifetime that is assigned by the MR, and
wherein the prefix lifetime is renewed by exchanging a fourth BU message between the MR and the HA,
wherein the fourth BU message comprises the Home Network Prefix option comprising the R flag, and
wherein the R flag of the fourth BU message is not set.

* * * * *

UNITED STATES PATENT AND TRADEMARK OFFICE
CERTIFICATE OF CORRECTION

PATENT NO.       : 8,493,910 B2                          Page 1 of 1
APPLICATION NO.  : 12/389565
DATED            : July 23, 2013
INVENTOR(S)      : Behcet Sarikaya et al.

It is certified that error appears in the above-identified patent and that said Letters Patent is hereby corrected as shown below:

In the Claims

Column 12 Line 9 - Claim 13 should read as follows:

13. The network component of claim 12, wherein the link is established using a security association based on an Internet Key Exchange (IKE) or IKE version 2 (IKEv2) protocol, wherein the MNP for the link is requested using a CFG_REQUEST payload message, wherein an Extensible Authentication Protocol (EAP) is used for providing authentication to the requesting router, and wherein the MNP for the link is received using a CFG_REPLY payload message.

Signed and Sealed this
Tenth Day of September, 2013

Teresa Stanek Rea
*Acting Director of the United States Patent and Trademark Office*